Aug. 19, 1924.  
H. A. MULVANY ET AL  
1,505,484  
SAND BLAST CLEANING METHOD AND APPARATUS THEREFOR  
Filed Aug. 29, 1921

INVENTORS  
HARRY A. MULVANY  
HARRY E. KENNEDY  
BY  
*Chas E. Townsend*  
ATTORNEY Patented Aug. 19, 1924.

1,505,484

UNITED STATES PATENT OFFICE.

HARRY A. MULVANY AND HARRY E. KENNEDY, OF BERKELEY, CALIFORNIA.

SAND-BLAST CLEANING METHOD AND APPARATUS THEREFOR.

Application filed August 29, 1921. Serial No. 496,406.

*To all whom it may concern:*

Be it known that we, HARRY A. MULVANY and HARRY E. KENNEDY, citizens of the United States, residing at Berkeley, in the county of Alameda and State of California, have invented new and useful Improvements in Sand-Blast Cleaning Methods and Apparatus Therefor, of which the following is a specification.

This invention relates particularly to a method and apparatus for dry cleaning eggs, but is applicable, as will later be described, to other articles, food products, etc.

The market value of eggs is very seriously reduced by foreign particles or stains upon the shells and it has accordingly been customary in the past to remove these blemishes by wiping the eggs with a damp cloth, washing them, etc. In most instances hand operation has been resorted to, but in some instances mechanical washers, etc., have been employed for the purpose of duplicating hand operation. However, a decided handicap attaches to any method which involves wetting or washing the eggs. This is due to the fact that an egg once dampened can not be preserved, but must be disposed of within a comparatively short period. Further, the cleaning of eggs by such methods leaves a distinct shine or gloss foreign to an untreated egg and is considered by the trade as undesirable.

It should be clear from the foregoing that a method of cleaning eggs which does not involve any of the above objections, and which will permit the handling of eggs in large quantities will represent a distinct advance in the state of the art, particularly when it is considered that moistening or wetting of the eggs is entirely avoided.

The present invention involves a method of dry cleaning; this being accomplished by resorting to the use of a finely divided abrasive projected against the shells or eggs by means of an air blast. In other words an abrasive such as sand or the like having an errosive action is employed and projected against the eggs by means of an air blast, and means for passing the eggs through the blast and for turning the same while subjected to the blast so as to expose all surfaces is also employed.

Another feature of the invention is the provision of an apparatus whereby a large number of eggs may be simultaneously treated. Further details and description of the method and apparatus employed will be had by referring to the accompanying drawings, in which—

Figure 1:
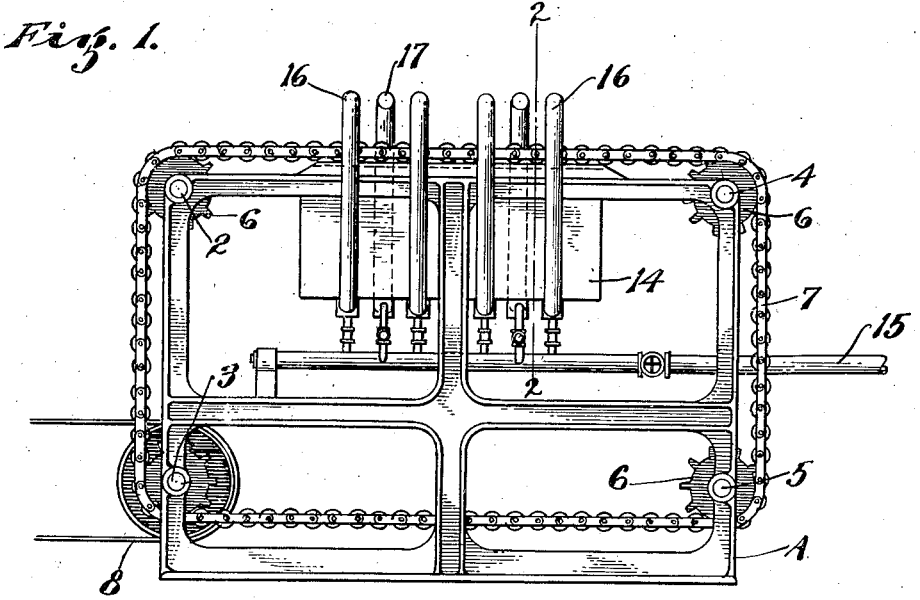
Fig. 1 is a side elevation of the apparatus partially in section.

Referring to the drawings in detail, A indicates a main frame, at each end of which is journalled a pair of superposed shafts as indicated at 2, 3, 4 and 5. Secured on each end of the respective shafts are sprocket wheels 6, and supported by each set of aligned sprockets is a pair of endless sprocket chains 7; power to drive the shafts, the sprockets and chains in unison being supplied from any suitable source and is transmitted thereto by means of a belt and pulley as indicated at 8.

Figure 2:
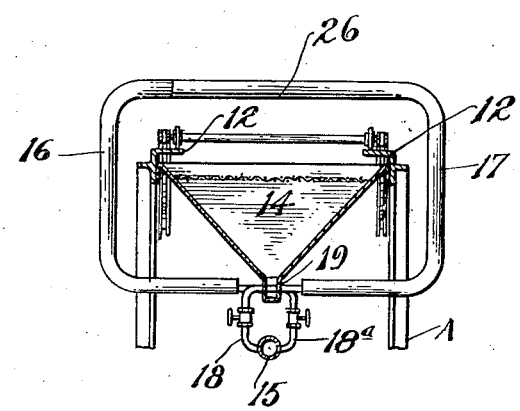
Fig. 2 is a cross section on line 2—2, Fig. 1.
Figure 3:
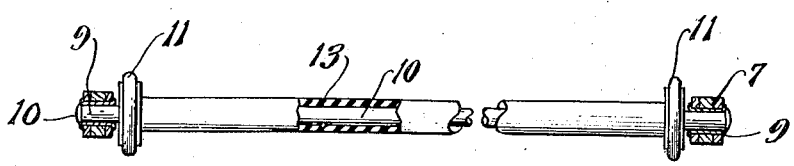
Fig. 3 is an enlarged detail cross sectional view of the conveyor chain and the roller supported thereby.

By referring to Fig. 3, it will be seen that the links of the chains 7 are pivotally connected by sleevelike pins 9, and that a shaft extends through each pair of aligned sleeves as indicated at 10. The shafts extend between the chains and connect the same, and they are so interspaced that the eggs may be deposited thereupon and rotated thereby as will hereinafter be described. The shafts are freely turnable in the sleeves 9, and means for imparting a rotating movement thereto while the eggs are subjected to a sand blast is provided, said means comprising rubber covered rollers secured at each end of each shaft as shown at 11, and a pair of track members 12 disposed below the rollers as shown in Figs. 1, 2 and 3.

For the purpose of insuring rotation of the eggs so as to expose all surfaces to the sand blast and to prevent breakage of the eggs, a rubber covering consisting of a tube 13 is placed upon each rod or shaft 10. This covering is of further importance as rubber will resist the errosive action of the sand or abrasive employed, while the rods if uncovered would rapidly wear away.

Disposed between the upper sets of sprocket wheels, secured on the shafts 2 and 4 and below the chain or conveyor passing over the same, is a hopper shaped pan 14. Mounted below the pan is an air supplying pipe 15 which is connected with a suitable source of air supply under pressure such as a high pressure blower or rotary compressor not here shown, and disposed on each side of the pan in a series of air nozzles such as indicated at 16 and 17. The nozzles are substantially U-shape in form and are connected at their lower ends with the pipe 15 and the bottom of the pan 14. This connection is formed by pipes 18 and 19. The pipes 19 communicate with the bottom of the pan, while the pipes 18 communicate with the main air supply pipe 15 and the respective nozzles 16 and 17; the pipes 18 connecting with the nozzle 17 disposed on one side of the pan, and pipes 18ª with the nozzle 16 disposed on the opposite side of the pan; pipes 18 and 18ª being all supplied with valves 20, whereby the volume of air delivered to the nozzles 16 and 17 may be regulated.

In actual operation it will be seen that the sprocket chains 7, together with the rods connecting the same, form an endless open conveyor upon which the eggs to be cleaned are deposited. They are placed on one end of the conveyor or that indicated at 25 by hand or any other suitable means, and as the width or distance between the chains is considerable, it is obvious that any suitable number of eggs may be placed between each set of rods as the conveyor is slowly moving. No turning movement takes place as far as the rubber covered rods 10 are concerned when the eggs are placed thereon, but as the conveyor advances to a point below the nozzles 17 and 16, rollers 11 will engage the track members 12 and a turning movement will then be transmitted to the rods thus causing the eggs to roll about their longitudinal axis and thus expose their entire surface to the action of the sand blast; the eggs being continually turned until the rollers leave the opposite ends of the tracks, or at a point adjacent that from which they are discharged. During the operation of the machine, as the eggs are to be advanced beneath the nozzles, it is obvious that air is being supplied by the pipe 15 to the several nozzles 16 and 17. These are, as previously described, staggered to project over the conveyor alternately from opposite sides. The eggs are for this reason subjected to a series of sand blasts before they are finally removed. The sand or abrasive employed is delivered to the pan 14 in any suitable manner. It falls by gravity through the pipes 19 into the pipes 18 and 18ª, respectively, and as air is being delivered to said pipes, it is obvious that the sand will be picked up and projected into the nozzles 16 and 17, from where it discharges through longitudinal slots 26 formed in the lower side of each nozzle. The sand blast is in this manner projected downwardly against the eggs passing beneath the nozzles or between the interspaced rods 10; the sand being returned to the pan 14 while the air is permitted to escape through the ends and sides of the pan. The sand may be used over and over again until it becomes too soiled for further use, and a screen is placed in the upper portion of the pan to collect larger particles of foreign matter removed from the eggs or shells or eggs which may have become accidentally broken; the material thus collected being removed from the screen in any suitable manner.

From the foregoing it can be seen that the apparatus disclosed has almost an unlimited capacity in so far as any number of nozzles may be employed, and the width and the length of the conveyor is similarly increased, thus providing a treating or blasting area of such a size as to handle any output desired. As an example of the above, the output from a single machine now in use exceeds fifteen thousand dozen eggs per eight hour day, and four men only are required; two being employed at the feeding end of the machine, and two at the opposite end. The eggs discharging are snow white in appearance and of a dull finish. The objection to moistening or wetting the surface of the eggs has been avoided and the distinct shine produced when eggs are washed is also prevented. The process is inexpensive as practically an abrasive, such as ordinary sand may be employed. The only power required is that for transmitting movement to the conveyor and for driving the compressor or blower employed. High pressure air is not required as in actual practice a one-half pound guage has been found more than sufficient.

We wish it distinctly understood that the method involved may be accomplished by the use of varying forms of apparatus, and that the apparatus here illustrated is only one form thereof which may be varied to suit conditions and requirements; further that while the method has been described as applied to eggs only, it is obvious that many articles and food products may be similarly treated. For instance walnuts when shelled are often stained and may be successfully treated by this method.

Having thus described our invention, what we claim and desire to secure by Letters Patent is—

1. The method of cleaning the entire surface of objects having a more or less circular periphery which consists in placing and entirely supporting them upon devices having a substantially circular periphery, rotating said devices and thereby rotating the articles and passing them while rotating through the field of a sand blast directed substantially normal to the direction of passage of said devices across the sand blast.

2. The method of cleaning the entire surface of objects having a more or less circular periphery which consists in placing and entirely supporting them upon a pair of spaced devices having substantially circular peripheries, rotating said devices and thereby rotating the articles and passing them while rotating through the field of a sand blast directed substantially normal to the direction of passage of said devices across the sand blast.

3. The method of cleaning the entire surface of objects having a more or less circular periphery which consists in placing and entirely supporting them upon devices having a substantially circular periphery, rotating said devices in an endless course which passes them while rotating through the field of a sand blast directed substantially normal to the direction of passage of said devices across the sand blast.

HARRY A. MULVANY.
HARRY E. KENNEDY.